(12) United States Patent
Franke

(10) Patent No.: US 8,739,765 B2
(45) Date of Patent: *Jun. 3, 2014

(54) HOSE COUPLING ELEMENT

(75) Inventor: Andreas Franke, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/283,336

(22) Filed: Oct. 27, 2011

(65) Prior Publication Data

US 2012/0103461 A1  May 3, 2012

(30) Foreign Application Priority Data

Oct. 27, 2010  (DE) .......................... 10 2010 060 209

(51) Int. Cl.
*F02M 37/08* (2006.01)
*F02M 3/04* (2006.01)

(52) U.S. Cl.
USPC ...................................... 123/509; 123/198 D

(58) Field of Classification Search
USPC ................ 123/509, 497, 198 D; 137/565.16, 137/565.17
See application file for complete search history.

(56) References Cited

U.S. PATENT DOCUMENTS

| 3,753,205 A | 8/1973 | Tuger |
| 4,729,583 A | 3/1988 | Lalikos et al. |
| 6,206,035 B1 * | 3/2001 | Wehner et al. ............ 137/565.16 |
| 7,040,298 B2 * | 5/2006 | Nakamura et al. ............ 123/509 |
| 8,435,058 B2 * | 5/2013 | Franke .......................... 439/181 |
| 2004/0169990 A1 * | 9/2004 | Wada ............................ 361/212 |
| 2007/0267071 A1 * | 11/2007 | Milton ..................... 137/565.24 |
| 2009/0230674 A1 * | 9/2009 | Villaire et al. ................ 285/179 |
| 2010/0308575 A1 * | 12/2010 | Rodenburg .................... 285/256 |

FOREIGN PATENT DOCUMENTS

| DE | 2639237 A1 | 3/1978 | |
| DE | 102005061606 B4 | 11/2007 | |
| JP | 2001260666 A * | 9/2001 | ............ B60K 15/01 |
| JP | 2001271718 A * | 10/2001 | ............ F02M 37/10 |

OTHER PUBLICATIONS

Franke, Andreas, "Coupling Element for Hydraulic Lines," U.S. Appl. No. 13/283,349, filed Oct. 27, 2011, 20 pages.

* cited by examiner

*Primary Examiner* — Mahmoud Gimie
(74) *Attorney, Agent, or Firm* — Julia Voutryas; Alleman Hall McCoy Russell & Tuttle LLP

(57) ABSTRACT

The disclosure relates to a coupling element between a hose and a further hydraulic line which may both be, for example, part of a fuel supply system. One system to couple said elements includes a hose-like element including an electrically conductive inside. Further a connecting element couples the hose-like element to the hydraulic line element, where the hose-like element includes an inverted double-walled end. In this way, electrostatic charge may be dissipated via the electrically conductive inside and fastening element.

20 Claims, 4 Drawing Sheets

HOSE COUPLING ELEMENT

RELATED APPLICATIONS

The present application claims priority to German Patent Application No. 102010060209.4, filed on Oct. 27, 2010, the entire contents of which are hereby incorporated by reference for all purposes.

FIELD

The disclosure relates to a coupling element for coupling two hydraulic lines, wherein one of said lines is a hose-like line.

BACKGROUND AND SUMMARY

Hydraulic lines may include all lines which are suitable for the passage of liquids or mixtures of liquids and gases. Lines of this type can be used, for example, as part of a fuel supply system, such as in a motor vehicle, and in the supply of a heating system, a power plant or the like. The fuel supply system of a motor vehicle, which is driven, for example, by a spark ignition or diesel internal combustion engine, typically has a fuel tank with an active or passive delivery module in order to supply the internal combustion engine with fuel via fuel lines. Fuel lines of this type comprise a multiplicity of line elements which can be designed, for example, in the form of tubes, flexible hoses or the like.

Since a fuel supply system includes a multiplicity of components, it is expedient to be able to couple the individual components in a simple manner and optionally also to be able to release them from one another again. For a releasable fastening of hoses, connectors are known, as described, for example, in U.S. Pat. No. 4,729,583. The connector presented therein includes two parts, wherein, in particular, good sealing to the hose and a stable design are intended to be made possible.

In a fuel supply system, the risk of an electrostatic charge may also be taken into consideration. Since fuel flows through the various components of the fuel supply system, such as through a primary fuel pump, optionally provided auxiliary pumps, through a fuel filter or through various valves and pipes, an electrostatic charge generated in the various conductive components of the fuel supply system may occur. In order to ensure electrical dissipation of such a charge, in fuel supply systems the components in the fuel flow or all of the components are constructed of conductive material and are coupled to the vehicle ground. This generally takes place by electric lines or else by direct fitting to the vehicle ground.

Dissipation of a possible electrostatic charge is readily possible in components of the fuel supply system that are produced from electrically conductive material, such as from metal and conductive polymer. However, materials of this type have a number of disadvantages. For example, conductive plastic is customarily more expensive and more brittle than nonconductive polymers which are typically used.

In order to deliver fuel from the delivery module/module pot to the associated flange, use is customarily made of a corrugated hose. The latter is customarily coupled nonreleasably to the flange and the delivery module via connectors with shaped profiles. It has turned out that a hose of this type has to be grounded for reliable operation of a motor vehicle. Said hoses are therefore entirely electrically conductive or are electrically conductive at least on the inside thereof, where said hoses are also in contact with the fuel.

Fuel supply systems are furthermore known, for example from DE 10 2005 061 606 A1, which contain a fuel delivery module which is arranged within a fuel tank. A delivery module of this type has a store for collecting the fuel from the tank and for conducting said fuel on to the internal combustion engine, and it may also contain a fuel pump. A fuel filter can be arranged within a delivery module of this type or at another location within the tank. In order to arrange the fuel delivery module and also the fuel filter within the tank, it is also known to use a tank flange which permits various inlets into the tank, such as via hydraulic and electric lines.

It is precisely in a tank flange of this type that the brittleness of electrically conductive polymers results in a reduction in the capability of being flexible in the event of loading or of withstanding forces determined in another manner, as may occur, for example, in the event of the motor vehicle having an accident. Furthermore, in the case of a conductive tank flange, electric insulation with respect to the electric power supply plug-in connectors arranged on the upper side and the picking up of signals from the level sensor are required.

The inventor herein has recognized the issues with the above approaches and provides a system to at least partly address them. In one embodiment, a coupling system comprises a hose-like element including an electrically conductive inside, a hydraulic line element, and a connecting element coupling the hose-like element to the hydraulic line element. The hose-like element includes an inverted double-walled end that houses part of the connecting element, and the inverted double-walled end is configured such that a portion of the electrically conductive inside is on an outside thereof. The coupling system also includes an annular fastening element in electrical contact with the outside of the inverted double-walled end of the hose-like element.

In this way, an end piece of the hose-like element—also called a hose—is guided over a connection of the hydraulic line and, in addition, is turned up in such a manner that a double layer of the hose wall is produced in sections and part of the inside of the hose points outward. Said inside is in electrical contact with a fastening element which is at least partially annular. The fastening element, which may be, for example, a clamping ring, a clamping clip or the like, presses the double layer of the hose wall onto the connection of the hydraulic line and thereby additionally brings about secure and tight coupling between the hose and the hydraulic line. In addition, by a suitable mechanism, such as a metal wire, the inside of the hose can be coupled to a predetermined potential, such as the ground potential of a motor vehicle, via the fastening element.

Because the inside of the hose which faces outward is itself conductive and coupled to a conducting device, electrostatic charge may be directed from the conductive interior of the hose to the conductive device and one or more grounded elements. This may allow the flange to be made of non-conductive materials, increasing the flange flexibility and improving component durability. By doing so, a coupling element for coupling a hose-like element to a hydraulic line may be provided, in particular a tube, and may prevent or dissipate electrostatic charges in a simple manner, and additionally also provide the option of producing a particularly tight coupling.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
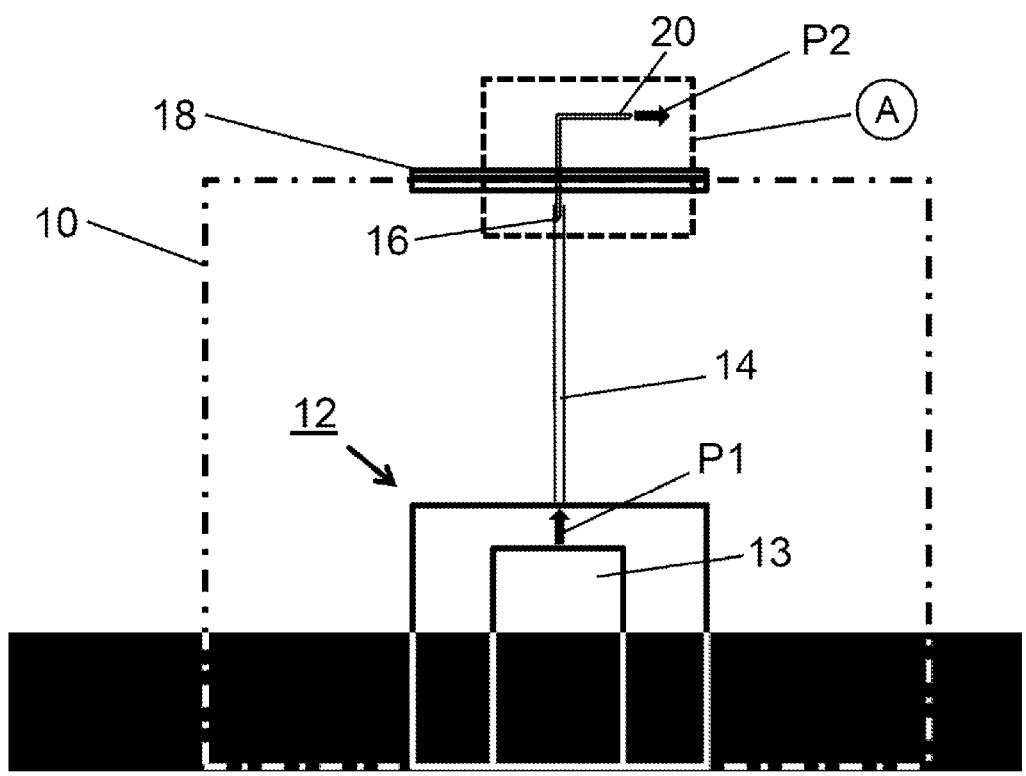
FIG. 1 shows a schematic depiction of a tank system according to an embodiment of the present disclosure.
Figure 2:
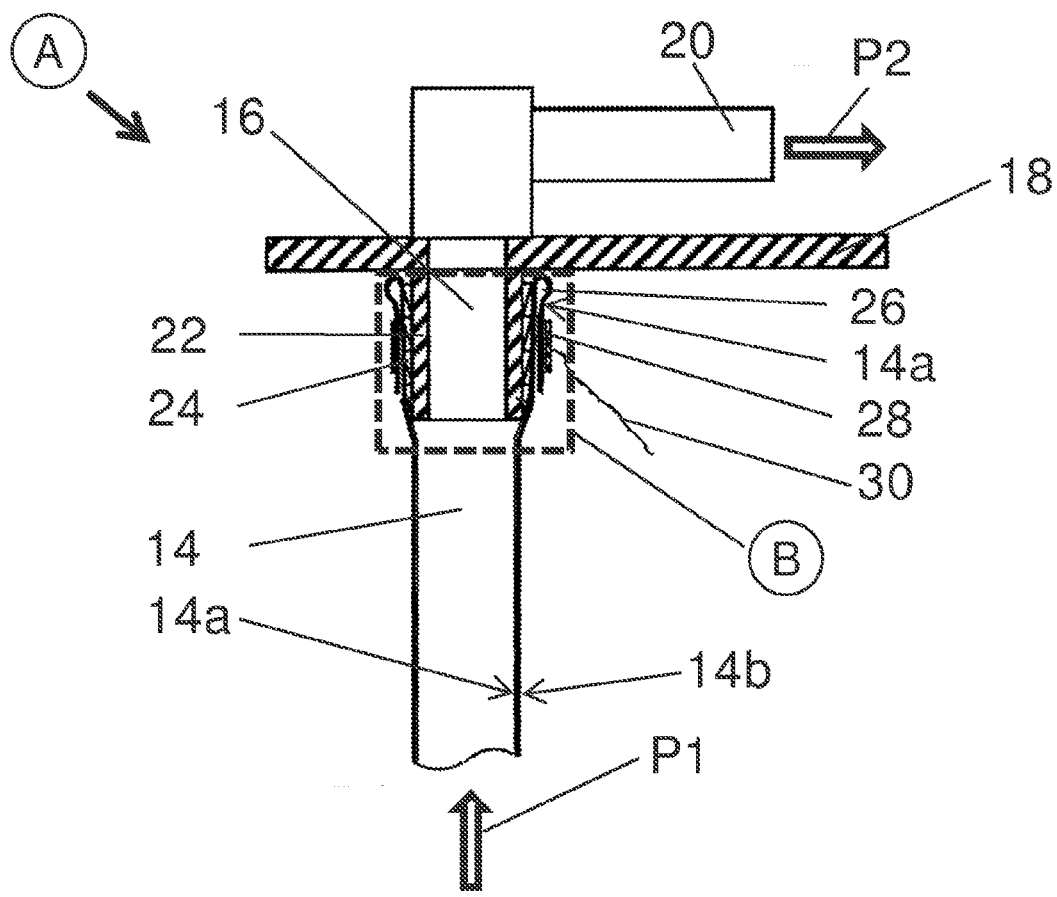
FIG. 2 shows a cross-sectional illustration of a coupling between a fuel hose and an adapter.
Figure 3:
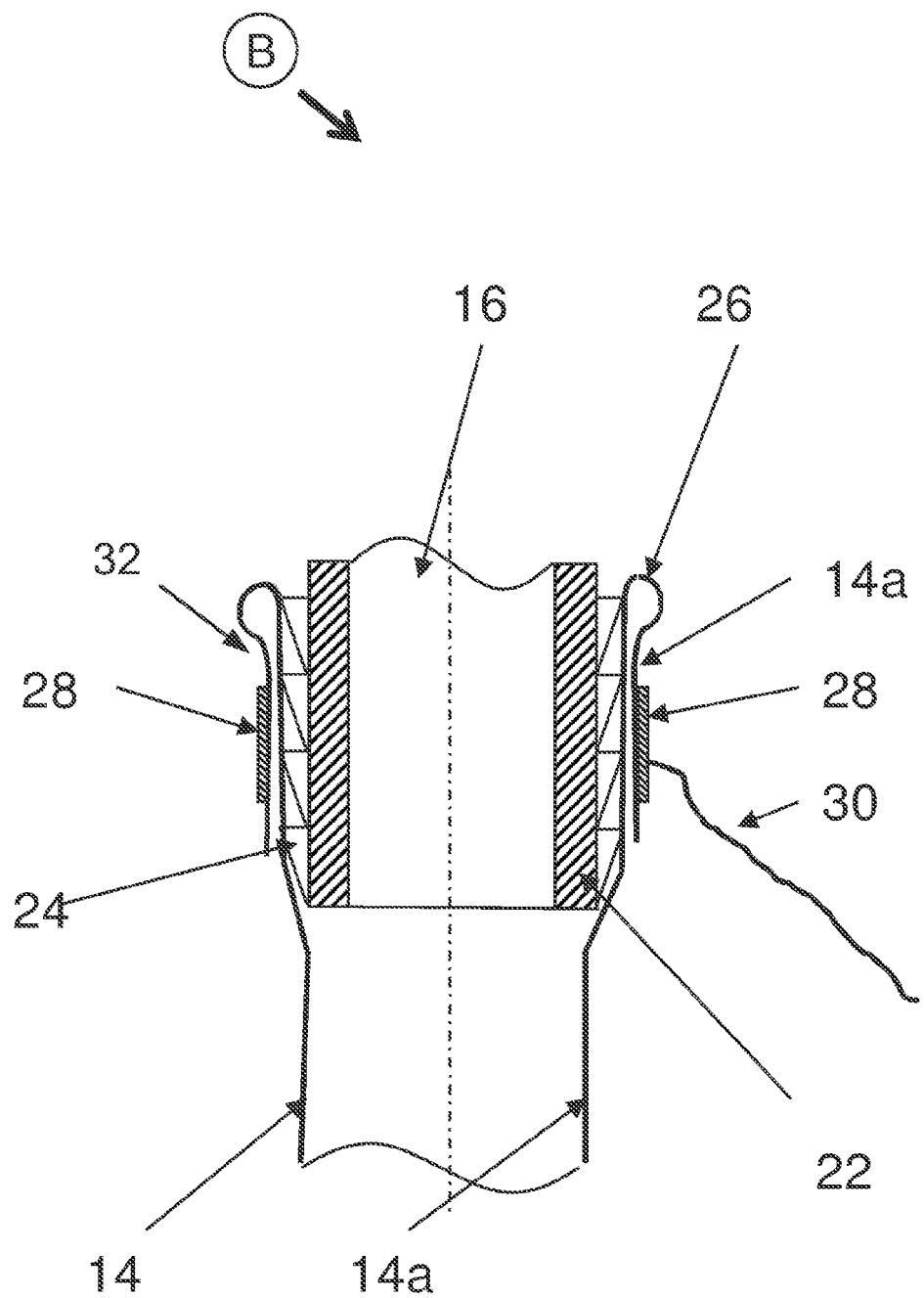
FIG. 3 shows an enlarged view of the region B from FIG. 2.
Figure 4:
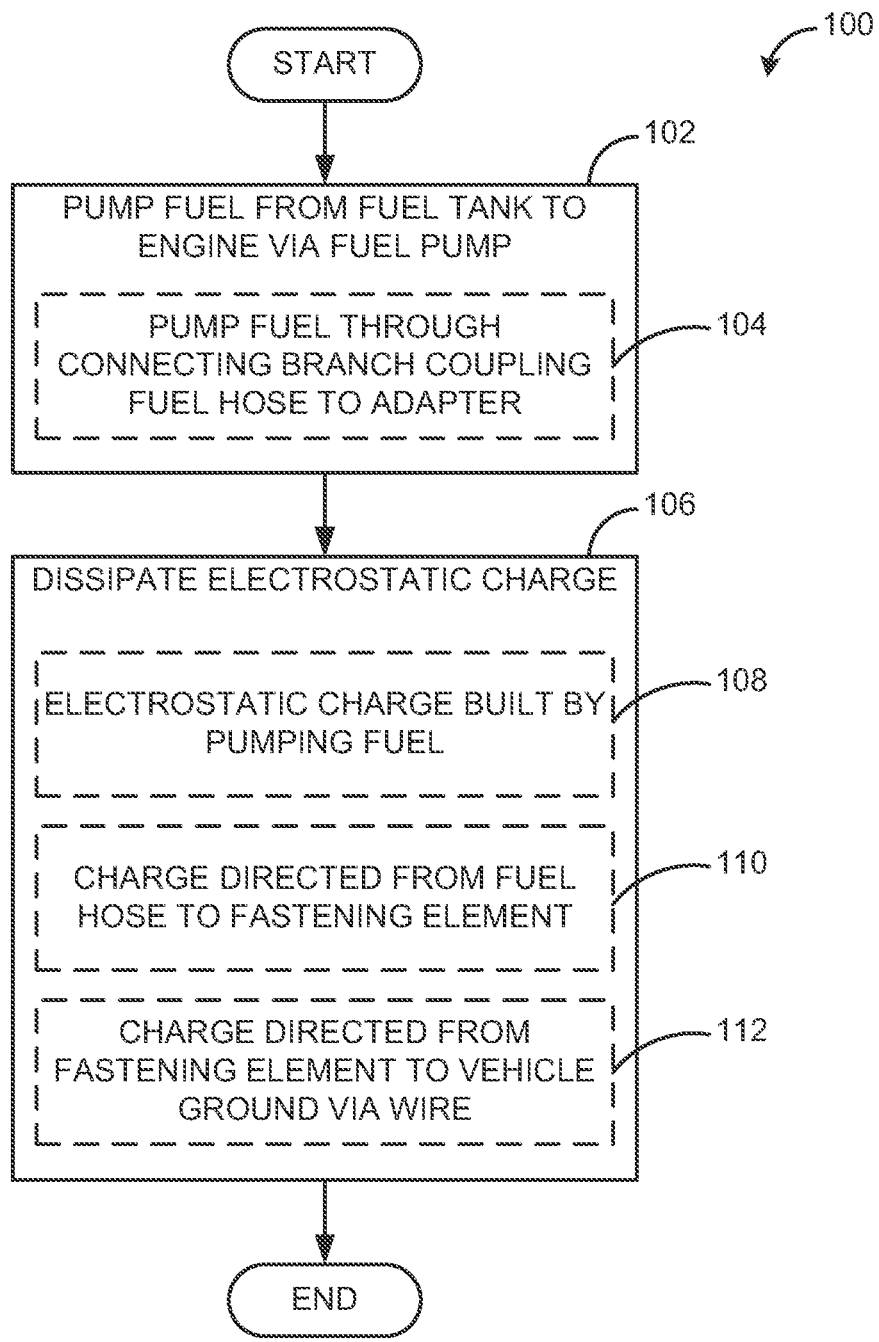
FIG. 4 shows a flow chart illustrating a method for dissipating electrostatic charge according to an embodiment of the present disclosure.

Fuel hoses may be lined with conductive materials in order to direct electrostatic charge, built up by pumping fuel, to the outside the fuel system to a vehicle ground. In one embodiment, the conductive layer is on the inner side of the hose, and is inverted at one end such that it is wrapped around with the inner layer to the outside, thus creating an inverted double-walled end portion of the hose. The conductive liner may then be connected to a wire via a conductive clamp or spring, and the wire may be coupled to the vehicle ground. FIGS. 1-3 show the conductive hose and connecting system in a fuel system. FIG. 4 is a method for pumping fuel through the conductive liner. In the various figures, identical parts are provided with the same designations, and therefore said parts are generally also only described once. Although the disclosure is substantially described with reference to a fuel supply system for motor vehicles, it is in no way restricted thereto.

FIG. 1 schematically shows an overview of a tank system, for example in a passenger vehicle. Here, 10 indicates a tank, the interior of which contains a fuel delivery module 12 which, in this exemplary embodiment, in particular contains a fuel pump 13 and a fuel filter (not illustrated). The fuel delivery module 12 is connected via a fuel hose 14 to an adapter 16 which is integrated in a flange 18 and has a connector 20 to connect to suitable elements via which an internal combustion engine can be supplied with fuel, for example a fuel line. The flange 18 is designed so as to be able to be fitted into an opening in the tank 10 and so as therefore to close the latter. Fuel, such as gasoline or diesel fuel contained in the tank, is conveyed by the fuel delivery module 12 in accordance with the arrows P1, P2 illustrated. While the adapter 16 is depicted in FIG. 1 as being positioned partially within the tank 10 and partially outside the tank 10, in some embodiments, the adapter 16 may be positioned fully within the tank 10, and may connect with the connector 20 at the opening of the tank 10.

The fuel hose 14 has an inside 14a, which is in contact with the conveyed fuel, and an outside 14b (also see FIG. 2). The inside 14a is electrically conductive, this being obtained by appropriate material, such as metal or a conductive polymer. By contrast, the outside 14b, the fuel line 16 and the flange 18 are made of a material, preferably a typical non-conductive polymer such as acetal, PTFE, PET, or PVC, POM, PPA which acts in an electrically insulating manner. In this case, electrically conductive denotes that there is conductivity by which an electrostatic charge, such as may occur in particular during the flow through of fuel, can be dissipated to a sufficient extent. Accordingly, electrically insulating indicates that an electrostatic charge of this type can hardly be dissipated, if at all.

The connection between the fuel hose 14 and the adapter 16, corresponding to the region A indicated by dashed lines, is illustrated in detail in FIG. 2. In this cross-sectional illustration, it can be seen that the fuel hose 14 is guided over a connecting branch 22 which has barb-shaped elements 24 which make it possible to simply produce the connection to the hose 14 but make it relatively difficult to release said connection again. The connecting branch 22 may be integral with the flange 18, as shown in FIG. 2. In other embodiments, the connecting branch 22 may be a part of the adapter 16, while in some embodiments, the connecting branch 22 may be separate from the flange 18 and the adapter 16.

The upper part of the hose 14 that houses the adapter 16 and connecting branch 22 is turned inside out, thus producing a loop 26, and part of the hose inside 14a is guided outwards. There is therefore a double layer of the hose 14 below the loop 26, based on the illustration in the figures (also see FIG. 3). In this region, a clamp 28 is clamped around the conductive inside 14a. A metal wire 30 is arranged on, preferably fastened to, the clamp 28.

The free end of the wire 30 leads to a location (not illustrated) which lies at ground potential, such as a fuel pump, part of the vehicle body or the like.

FIG. 3 shows on an enlarged scale the region B which is marked by dashed lines in FIG. 2.

The following function is fulfilled by the coupling arrangement illustrated in the exemplary embodiment. The fuel delivery module 12 forms a store for collecting the fuel from the tank and for conducting said fuel onto the internal combustion engine (not illustrated here). As a result, it is ensured, even under special driving situations, that fuel can be conveyed to the associated internal combustion engine even if the tank 10 is only partially filled. In a case where the module is equipped with a pump, fuel is pumped by the fuel pump 13 along the arrow P1 into the hose 14 and passes via the adapter 16 and the connector 20 along the arrow P2 to the engine. In a case where the module is not equipped with a pump, fuel is sucked by the engine along the arrow P1 into the hose 14 and passes via the adapter 16 and the connector 20 along the arrow P2 to the engine. During the conveying of the fuel, there is the risk of the fuel and the components within the fuel store, fuel supply line and fuel preparation region being electrostatically charged. In order to reliably dissipate said charge, coupling to the vehicle ground is required. When the fuel is conveyed through the hose 14, the charge is dissipated via the inside 14a of the hose 14, the clamp 28 and the wire 30 which is connected to the vehicle ground.

By the formation of the loop 26 and the resultant double layer of the hose 14 within the clamp 28, the coupling between the hose 14 and the connecting branch 22 or the flange 18 also has very good and improved sealing properties. This prevents fuel from being able to leak out at this point.

The end of the hose 14 which is coupled to the adapter 16 may comprise an inverted double-walled end portion 32 that houses at least a part of the connecting branch 22. The inverted double-walled end portion 32 may be configured such that a portion of the conductive inside liner 14a of the hose 14 is positioned on an outside of the hose 14. The fastening element, or clamp, 28 may be coupled to the conductive liner that is arranged on the outside of the inverted double-walled end portion 32. The conductive liner on the inside 14a of the hose 14 may be continuous with the conductive outside of the inverted double-walled end portion 32 such that electrostatic charge may conducted from the inside of the hose to the outside of the hose via the inverted double-walled end portion 32.

The exemplary embodiment described is merely by way of example and may be modified or supplemented in diverse ways. For example, in some embodiments, the fuel pump 13 can be arranged outside the tank 10. The free end of the wire 30, or of another device suitable for the connection to ground, can be connected to a resistance card, a ground connection of the fuel pump, and/or directly to a grounded part. Furthermore, it is also conceivable to produce a coupling to parts of the module 12 and to correspondingly ground said coupling.

In some embodiments, the adapter 16 may be an integral part of the flange 18. In other embodiments, it is also possible to manufacture said adapter separately and to subsequently incorporate it in the flange. This can be undertaken, for example, by overmolding, welding, pressing-in, latching or the like, and appropriate sealing has to be taken into consideration.

Instead of the hose 14 which is turned inside out, use may also be made of a separate sleeve or of another element made of a conductive material, which transports the charge from the inside of the hose 14 to the outer circumference thereof.

Instead of a multi layer tube 14 containing 14a and 14b, also a mono layer conductive tube might be used which is fixed to adapter 16 by using clamp 28.

Turning to FIG. 4, a method 100 for dissipating electric charge is shown. Method 100 comprises, at 102, pumping fuel from a fuel tank to an engine via a fuel pump. Fuel may be pumped to the engine in order to supply the fuel to injectors for injecting the fuel into combustion chambers, for example, where the fuel is used to power the engine. Pumping fuel to the engine comprises pumping fuel through a connecting branch or element coupling a fuel hose to a fuel line at 104. The fuel hose may be coupled to the fuel pump, and may direct the fuel to the adapter, which may be coupled a fuel line to deliver fuel to one or more fuel injectors or a fuel rail or to a high pressure pump. The fuel hose and the adapter may be coupled to each other at an outlet of the fuel tank. The hose and adapter may be fluidically coupled by the connecting element in a releasable manner, such that they may be surely connected but may be easily released from each other.

At 106, method 100 comprises dissipating electrostatic charge. The electrostatic charge may be built up by the fuel being pumped through the fuel hose at 108. As explained above with respect to FIGS. 1-3, the fuel hose may include an interior that is conductive. As such, the electrostatic charge may be directed from the fuel hose to a fastening element at 110. The fuel hose may be configured to have an inverted double-walled end such that a portion of the conductive inside that lines the fuel hose may be on the outside of the inverted double-walled end, and may be coupled to the fastening element. At 112, the charge may be directed from the fastening element to the vehicle ground via a wire. As the conductive insert is made of conductive materials, it can direct the charge from the fuel hose to one or more conductive elements, such as the fastening element. In this embodiment, the clamp that secures the fuel hose to the fuel line via the connecting element may be conductive. Additionally, the clamp may be connected to a wire. Further, the wire may be connected to one or more grounded elements, such as the fuel pump, or a grounding cable. In this way, the charge from the fuel may be directed through the hose and to the vehicle ground via the clamp and wire.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. For example, one embodiment includes a coupling system, comprising a first hydraulic hose electrically conductive only on an inside; a second hydraulic hose; an electrically conductive intermediate element with a first end projecting only partially into the first hydraulic hose; a releasable fastening element coupling the intermediate element to the second hydraulic hose; and a conducting device conductively coupled between vehicle ground and the intermediate element.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A coupling system, comprising:
   a hose-like element including an electrically conductive inside turning inside-out at an inverted double-walled end;
   a hydraulic line element;
   a connecting element coupling the hose-like element to the hydraulic line element the inverted double-walled end housing part of the connecting element; and
   an annular fastening element clamped directly around the inverted double-walled end to be in electrical contact with an outside of the inverted double-walled end.

2. The coupling system as claimed in claim 1, wherein the hose-like element and the hydraulic line element are part of a fuel supply system for an internal combustion engine or a heating system.

3. The coupling system as claimed in claim 1, wherein the hose-like element is coupled to a fuel delivery module.

4. The coupling system as claimed in claim 1, wherein the hydraulic line element is integrated in a flange.

5. The coupling system as claimed in claim 1, wherein the fastening element is a clamping ring or a clamping clip.

6. The coupling system as claimed in claim 1, wherein the connecting element includes barb-shaped elements to couple the hose-like element to the hydraulic line element.

7. The coupling system as claimed in claim 1, wherein the connecting element is integral with the hydraulic line element.

8. The coupling system as claimed in claim 1, wherein the electrically conductive inside is coupled to a predetermined electric potential by a wire via the fastening element.

9. The coupling system as claimed in claim 8, wherein the predetermined electric potential comprises a ground potential of a vehicle or a ground potential of a heating system.

10. A fuel system for a vehicle, comprising:
    a fuel tank;
    a fuel line configured to deliver fuel to an engine of the vehicle, the fuel line connected to a fuel hose of the fuel tank via an adapter, the fuel hose including an electrically conductive inside, and including an end turned inside-out to form an inverted double-walled end such that part of the electrically conductive inside is positioned on an outside of the fuel line; and a connecting branch fluidically coupling the fuel hose to the adapter, the connecting branch housed in the inverted double-walled end, the inverted double-walled end coupled to a fastening element with the fastening element in electrical contact with an outside of the inverted double-walled end of the hose-like element, the fastening element connected to a wire.

11. The fuel system of claim 10, wherein the wire is connected to one or more grounding elements of the vehicle.

12. The fuel system of claim 11, wherein the one or more grounding elements comprises a fuel pump coupled to the fuel tank.

13. The fuel system of claim 10, wherein the fastening element comprises a clamp made of conductive material.

14. The fuel system of claim 10, wherein the connecting branch is housed in the fuel hose and connected therein via barb-shaped elements.

15. A method for dissipating electrostatic charge, comprising:

pumping fuel from a fuel tank to an engine through a connecting branch coupled to a fuel line, the connecting branch housed in an inverted double-walled end portion of a fuel hose, the fuel hose including an electrically conductive inside turned inside-out, the inverted double-walled end portion coupled to a conductive fastening element; and directing electrostatic charge to the conductive fastening element connected to a wire.

16. The method of claim 15, wherein the wire is connected to one or more grounded elements, the method further comprising:

directing electrostatic charge from the fuel to the fuel hose; and directing electrostatic charge from the fuel hose to the conductive fastening element.

17. The method of claim 15, wherein pumping fuel from a fuel tank to the engine further comprises pumping fuel via a fuel pump, the fuel pump connected to the wire, and wherein the electrically conductive inside is turned inside-out onto an outside of the inverted double-walled end portion.

18. The method of claim 15, wherein the connecting branch is further configured to couple a fuel hose to an adapter coupled to the fuel line in a releasable manner.

19. The method of claim 15, wherein the fuel is pumped from the fuel tank to the engine through the fuel hose, the fuel hose including a conductive inside.

20. The method of claim 19, wherein the conductive inside of the fuel hose is continuous with an outside of the inverted double-walled end portion of the fuel hose.

* * * * *